United States Patent
Kuehnle et al.

(10) Patent No.: US 9,342,747 B2
(45) Date of Patent: May 17, 2016

(54) VEHICLE DRIVER ASSISTANCE APPARATUS FOR ASSISTING A VEHICLE DRIVER IN MANEUVERING THE VEHICLE RELATIVE TO AN OBJECT

(71) Applicant: Bendix Commercial Vehicle Systems LLC, Elyria, OH (US)

(72) Inventors: Andreas U. Kuehnle, Strangnas (SE); Robert G. Charnock, Anaheim, CA (US); Arturo M. Guzman, Orange, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 123 days.

(21) Appl. No.: 14/251,762

(22) Filed: Apr. 14, 2014

(65) Prior Publication Data

US 2015/0294166 A1 Oct. 15, 2015

(51) Int. Cl.
*B60R 1/00* (2006.01)
*G06K 9/00* (2006.01)
*B60Q 9/00* (2006.01)
*B60Q 1/22* (2006.01)
(Continued)

(52) U.S. Cl.
CPC .............. *G06K 9/00805* (2013.01); *B60Q 1/22* (2013.01); *B60Q 9/007* (2013.01); *B60Q 9/008* (2013.01); *B60R 1/00* (2013.01); *B60T 7/22* (2013.01); *G01C 3/08* (2013.01); *G06K 9/00812* (2013.01); *G08G 1/168* (2013.01); *B60R 2300/30* (2013.01); *B60R 2300/806* (2013.01); *G06K 2207/1012* (2013.01)

(58) Field of Classification Search
CPC ........ B60Q 1/525; B60Q 9/008; B60Q 9/007; B60Q 9/002; G01S 13/931; G01S 2013/9317; G01S 2013/9378; G01S 15/931

USPC ................. 701/301, 300, 32.5, 527; 702/158; 340/425.5, 435; 382/104, 103; 348/148, 135
See application file for complete search history.

(56) References Cited

U.S. PATENT DOCUMENTS

| 4,214,266 A | 7/1980 | Myers |
| 4,942,533 A * | 7/1990 | Kakinami ............... G01S 11/12 340/937 |

(Continued)

FOREIGN PATENT DOCUMENTS

| JP | 2004110521 A | 9/2002 |
| WO | WO2010044127 A1 | 4/2010 |

OTHER PUBLICATIONS

International Searching Authority, International Search Report, report, Aug. 11, 2015, 14 pages, European Patent Office, Rijswijk, Netherlands.

*Primary Examiner* — Thomas G Black
*Assistant Examiner* — Sara Lewandroski
(74) *Attorney, Agent, or Firm* — Cheryl L. Greenly; Brian E. Kondas; Eugene E. Clair (57) ABSTRACT

A vehicle driver assistance apparatus is provided for a vehicle. The vehicle driver assistance apparatus comprises an image capture device arranged to capture image data which is representative of an object in vicinity of the vehicle. The vehicle driver assistance apparatus further comprises an electronic controller arranged to (i) process the captured image data to identify an edge line associated with the object, and (ii) process the captured image data further based upon the identified edge line to identify a distance between the vehicle and the edge line of the object.

15 Claims, 6 Drawing Sheets

(51) Int. Cl.
    *B60T 7/22*             (2006.01)
    *G01C 3/08*            (2006.01)
    *G08G 1/16*            (2006.01)

(56) References Cited

U.S. PATENT DOCUMENTS

| | | | | |
|---|---|---|---|---|
| 5,574,426 A * | 11/1996 | Shisgal | B60Q 9/007 | 180/271 |
| 6,078,849 A * | 6/2000 | Brady | B60T 7/22 | 180/167 |
| 6,172,601 B1 | 1/2001 | Wada | | |
| 6,693,524 B1 * | 2/2004 | Payne | B60Q 9/005 | 340/431 |
| 6,865,138 B1 * | 3/2005 | Li | B60Q 9/006 | 340/436 |
| 6,923,080 B1 | 8/2005 | Dobler et al. | | |
| 7,375,621 B1 * | 5/2008 | Hines | B60Q 9/005 | 340/435 |
| 7,620,518 B2 * | 11/2009 | Schmid | G01S 13/931 | 342/189 |
| 8,164,628 B2 * | 4/2012 | Stein | G01C 3/22 | 348/135 |
| 8,643,724 B2 | 2/2014 | Schofield et al. | | |
| 2004/0016870 A1 * | 1/2004 | Pawlicki | G06K 9/4604 | 250/208.1 |
| 2004/0155811 A1 * | 8/2004 | Albero | B60K 31/0008 | 342/70 |
| 2005/0073433 A1 * | 4/2005 | Gunderson | B60Q 9/006 | 340/903 |
| 2006/0256198 A1 * | 11/2006 | Nishiuchi | G06T 7/0042 | 348/148 |
| 2007/0208482 A1 * | 9/2007 | Thiede | B60K 31/0008 | 701/70 |
| 2008/0042865 A1 * | 2/2008 | Shephard | B65G 69/006 | 340/686.6 |
| 2008/0088707 A1 * | 4/2008 | Iwaki | G01S 13/931 | 348/208.1 |
| 2008/0167781 A1 * | 7/2008 | Labuhn | B60W 30/08 | 701/48 |
| 2009/0309710 A1 | 12/2009 | Kakinami | | |
| 2010/0045448 A1 * | 2/2010 | Kakinami | B60R 1/00 | 340/435 |
| 2011/0082613 A1 * | 4/2011 | Oetiker | B60W 10/20 | 701/25 |
| 2012/0170808 A1 * | 7/2012 | Ogata | B60R 21/0134 | 382/103 |
| 2012/0327239 A1 * | 12/2012 | Inoue | B60R 1/00 | 348/148 |
| 2013/0138276 A1 * | 5/2013 | Soderi | B61L 3/008 | 701/19 |
| 2013/0138314 A1 * | 5/2013 | Viittala | B61L 15/0027 | 701/70 |
| 2013/0242101 A1 * | 9/2013 | Schneider | G08G 1/168 | 348/148 |
| 2013/0297173 A1 | 11/2013 | Takagi | | |
| 2013/0322688 A1 * | 12/2013 | Tsuchiya | G08G 1/167 | 382/103 |
| 2014/0078302 A1 | 3/2014 | Hamdan | | |
| 2014/0297171 A1 * | 10/2014 | Minemura | G08G 1/166 | 701/301 |
| 2014/0300722 A1 * | 10/2014 | Garcia | G06T 7/602 | 348/77 |
| 2014/0375804 A1 * | 12/2014 | Bulan | H04N 7/18 | 348/148 |
| 2015/0014533 A1 * | 1/2015 | Nakamura | G08G 1/166 | 250/336.1 |
| 2015/0235091 A1 * | 8/2015 | Kumano | G06K 9/00798 | 340/435 |

\* cited by examiner

VEHICLE DRIVER ASSISTANCE APPARATUS FOR ASSISTING A VEHICLE DRIVER IN MANEUVERING THE VEHICLE RELATIVE TO AN OBJECT

BACKGROUND

The present application relates to vehicles moving relative to an object, and is particularly directed to a vehicle driver assistance apparatus for assisting a vehicle driver in maneuvering the vehicle relative to an object, such as a truck driver backing up a truck trailer to the dock edge of a truck loading dock.

In some trucks, a camera may be mounted on the truck to view a target on the loading dock to indicate to the truck driver the distance between the truck trailer and the edge of the loading dock. In some other trucks, a number of lasers may be used in conjunction with a number of cameras to determine the distance between the truck trailer and the edge of the loading dock. It would be desirable to provide a relatively simple and reliable vehicle driver assistance apparatus to assist a vehicle driver in maneuvering the vehicle (such as the truck trailer) relative to an object (such as the edge of the loading dock).

SUMMARY

In accordance with one embodiment, a vehicle driver assistance apparatus is provided for a vehicle. The vehicle driver assistance apparatus comprises an image capture device arranged to capture image data which is representative of an object in vicinity of the vehicle. The vehicle driver assistance apparatus further comprises an electronic controller arranged to (i) process the captured image data to identify an edge line associated with the object, and (ii) process the captured image data further based upon the identified edge line to provide a signal which is indicative of a distance between the vehicle and the edge line of the object.

In accordance with another embodiment, a vehicle driver assistance apparatus is provided for a vehicle having an image capture device which captures successive images of an object in vicinity of the vehicle. The vehicle driver assistance apparatus comprises a driver display device, and means for presenting on the driver display device the distance between the vehicle and an edge line of the object based upon mathematical calculations involving at least one edge line contained in the captured successive images of the object in vicinity of the vehicle.

In accordance with yet another embodiment, a method is provided of processing images having a first edge line of an object in vicinity of a vehicle to determine a distance between the vehicle and the object. The method comprises the steps of receiving a first image containing the first edge line of the object in vicinity of the vehicle at a first time, receiving a second image containing the first edge line in vicinity of the vehicle at a second time which is after the first time, and determining the distance between the vehicle and the object based upon a comparison of the relative positions of the first edge line in the first image and the first edge line in the second image.

DETAILED DESCRIPTION

Figure 1:
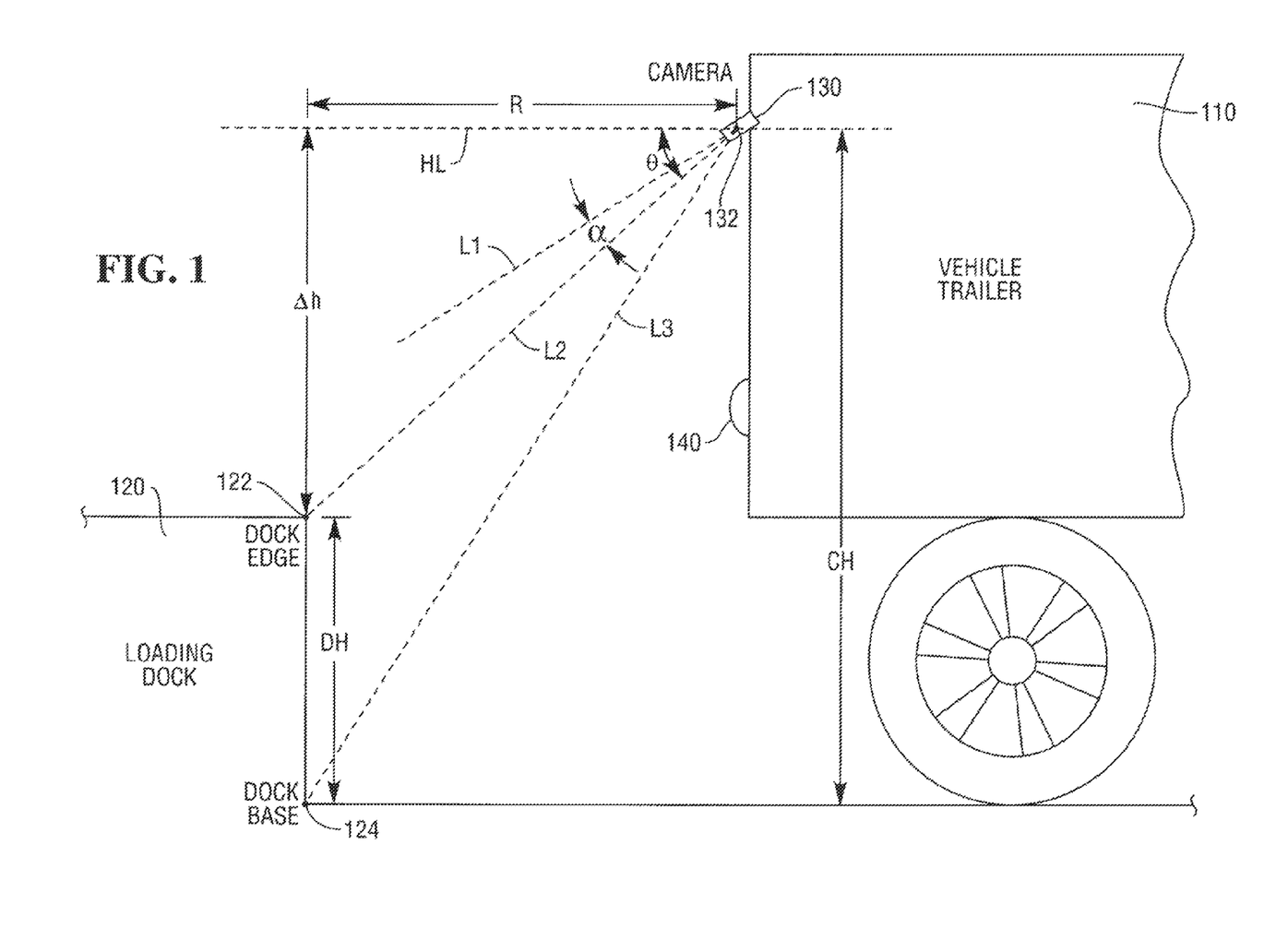
FIG. 1 is a schematic diagram of a vehicle trailer backing up to an edge of a loading dock.

Referring to FIG. 1, vehicle trailer 110 is being backed up towards loading dock 120. Loading dock 120 has dock edge 122 which is spaced apart a vertical distance DH above dock base 124 which is usually at ground level. Distance DH is typically in the range of 120 cm to 130 cm for a truck loading dock. Height of vehicle trailer 110 above ground level may be any height, and a typical truck trailer extends about 2.5 meters above ground level. Dock edge 122 extends horizontally and in a direction which is into the page as viewed when looking at FIG. 1.

Image capture device 130 having an optical axis L1 is mounted on trailer 110. Image capture device 130 is mounted near top of trailer 110. Other mounting locations for image capture device 130 on trailer 110 are possible. As shown in FIG. 1, image capture device 130 has center point 132 of its optical axis. Image capture device 130 is mounted at a vertical distance CH above ground (i.e., the dock base 122). Accordingly, center point 132 is a vertical distance $\Delta h$ above dock edge 122, as calculated by subtracting distance DH from distance CH. Height $\Delta h$ depends upon the height the image capture device 130 is mounted on trailer 110. As an example, the value of $\Delta h$ may in the range of 1000 cm and 2000 cm for a typical vehicle trailer.

Also as shown in FIG. 1, center point 132 is a horizontal distance R from the vertical projection of dock edge 122 onto horizontal extension line HL. Angle $\theta$ is formed between horizontal extension line HL and sight line L2 which extends from center point 132 to dock edge 122. Angle $\alpha$ is formed between optical axis L1 and sight line L2 which extends from center point 132 to dock edge 122. Sight line L3 extends from center point 132 to dock base 124.

Image capture device 130 may comprise any conventional type of high-speed digital video camera which captures image data in real time. Camera 130 may comprise a backward looking camera. For example, camera 130 may comprise an imaging device including a Sunex® miniature ultra-wide-angle lens and an Omnivision® High Dynamic Range imaging chip. As another example, camera 130 may comprise part of a conventional vehicle visioning system, as is known. Certain components of the vehicle visioning system may depend upon the particular type of vehicle in which the visioning system is installed. Optional light source 140 may be provided on trailer 110 to illuminate the area in vicinity of loading dock 120 when trailer is being backed up towards dock edge 122 of loading dock 120.

Figure 2:
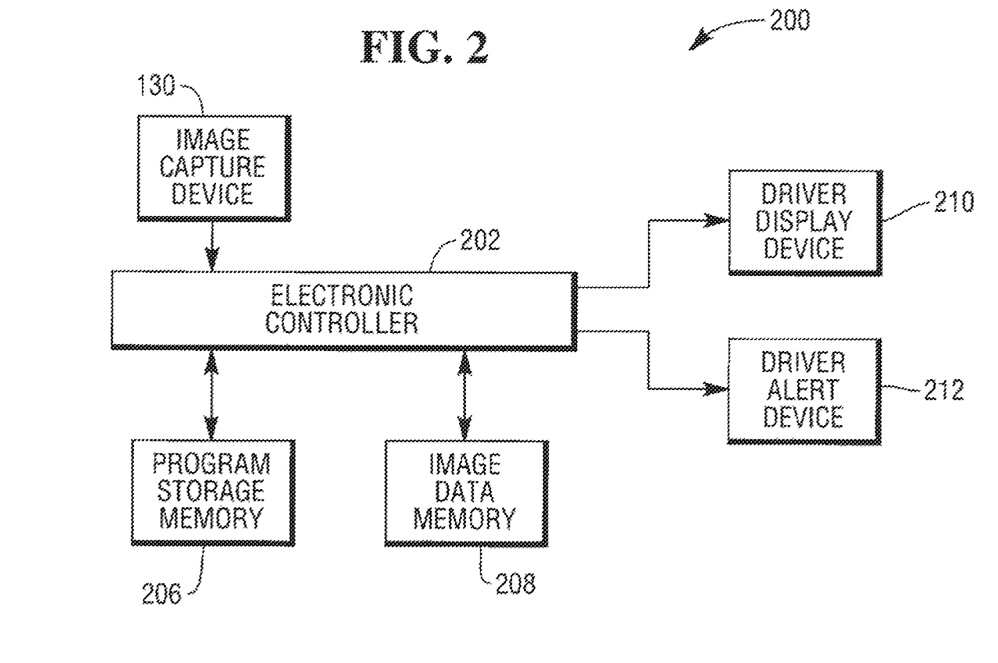
FIG. 2 is a schematic block diagram showing a vehicle driver assistance apparatus constructed in accordance with an embodiment, and used with the vehicle trailer shown in FIG. 1.

Referring to FIG. 2, apparatus 200 is constructed in accordance with one embodiment. Apparatus 200 comprises image capture device 130 shown in FIG. 1. Apparatus further comprises electronic controller 202 which receives captured image data from camera 130, and stores captured image data in image data memory 208. Structure and operation of vehicle visioning systems including controllers, cameras, and data memories are known and, therefore, will not be described.

Controller 202 provides one or more signals to driver display device 210 located in the driver compartment of the vehicle when controller 202 executes an application program stored in program storage memory 206. Controller 202 may also provide one or more signals to driver alert device 212. Driver alert device 212 may be located in the vehicle and may include any combination visual, audible, and haptic devices, for example. Alternatively, or in addition to, driver alert device 212 may be located outside of the vehicle and may include any combination of visual and audible devices, for example.

Components of apparatus 200 may be powered on when vehicle ignition is turned on. Components of apparatus 200 co-operate to provide an indication to the vehicle driver of the running distance between trailer 110 and dock edge 122 of loading dock 120 as trailer 110 is backing up to loading dock 120 as shown in FIG. 1. It should be apparent that the running distance between trailer 110 and dock edge 122 of loading dock 120 is represented by the horizontal distance R shown in in FIG. 1. The indication to the vehicle driver of the running distance is provided in accordance with a method to be described hereinbelow.

Figure 3:
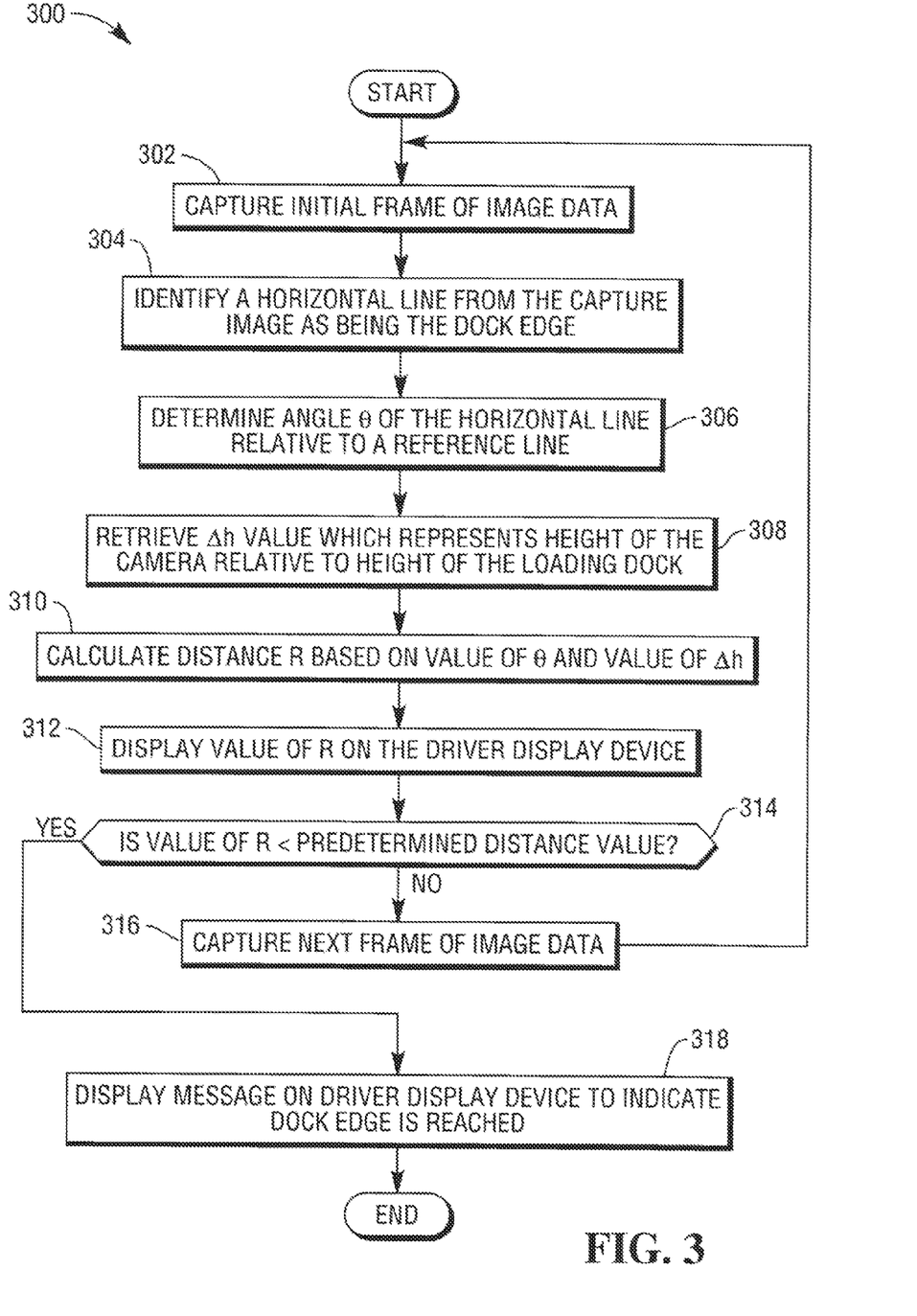
FIG. 3 is a flow diagram depicting a method of operation of the vehicle driver assistance apparatus of FIG. 2 in accordance with an embodiment.

Referring to FIG. 3, flow diagram 300 depicts operation of apparatus 200 of FIG. 2 in accordance with one embodiment. Program instructions for enabling controller 202 shown in FIG. 2 to perform operation steps in accordance with flow diagram 300 shown in FIG. 3 may be embedded in memory internal to controller 202. Alternatively, or in addition to, program instructions may be stored in memory external to controller 202. As an example, program instructions may be stored in memory internal to a different controller of the vehicle. Program instructions may be stored on any type of program storage media including, but not limited to, external hard drives, flash drives, and compact discs. Program instructions may be reprogrammed depending upon features of the particular controller.

Figure 4A:
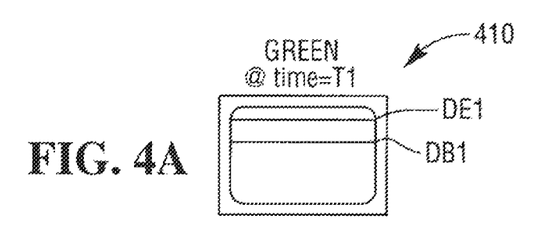
FIGS. 4A, 4B, and 4C show successive display screens which are presented on a vehicle driver display device as the vehicle trailer in FIG. 1 is backing up to the edge of the loading dock.
Figure 4B:
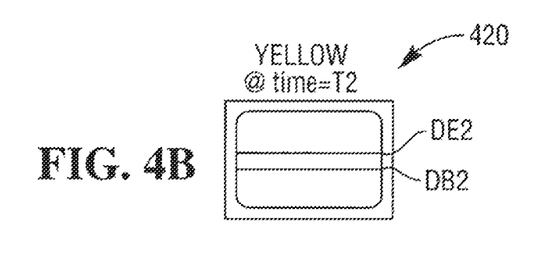
Figure 4C:
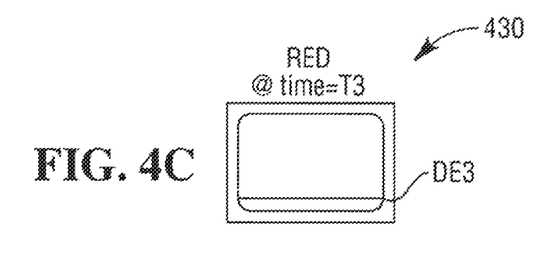
Figures 5A, 5B, 5C:
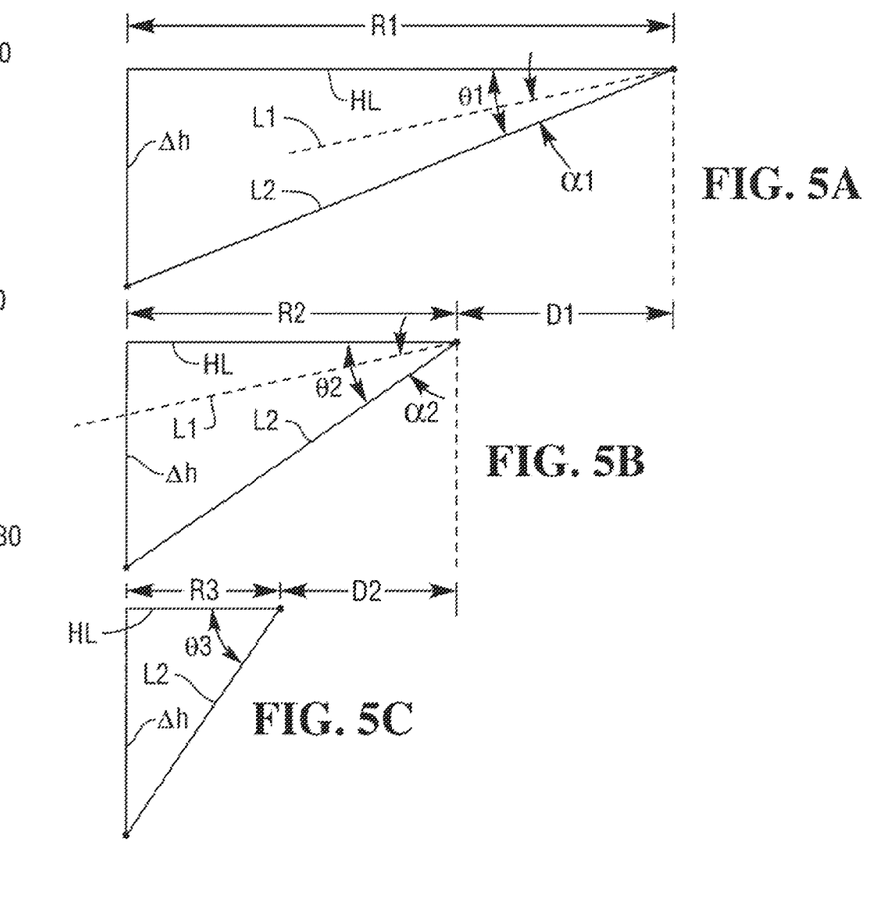
FIGS. 5A, 5B, and 5C show successive trigonometric relationships between the vehicle trailer and the edge of the loading dock as the vehicle trailer in FIG. 1 is backing up to the edge of the loading dock.

Reference to FIGS. 4A, 4B, and 4C and FIGS. 5A, 5B, and 5C will be made as steps contained in flow diagram 300 are being described hereinbelow. FIGS. 4A, 4B, and 4C show successive display screens 410, 420, and 430, respectively, which are presented on driver display device 210 (FIG. 2) as trailer 110 shown in FIG. 1 is backing up to dock edge 122 of loading dock 120. FIGS. 5A, 5B, and 5C show successive trigonometric relationships between trailer 110 and dock edge 122 of loading dock 120 as trailer 110 is backing up to dock edge 122 of loading dock 122. The three trigonometric relationships shown in FIGS. 5A, 5B, and 5C correspond to the three successive display screens shown in FIGS. 4A, 4B, and 4C. More specifically, the trigonometric relationships shown in FIG. 5A correspond to position of dock edge DE1 shown in FIG. 4A, the trigonometric relationships shown in FIG. 5B correspond to position of dock edge DE2 shown in FIG. 4B, and the trigonometric relationships shown in FIG. 5C correspond to position of dock edge DE3 shown in FIG. 4C.

In step 302 in FIG. 3, camera 130 captures an initial frame of image data which is representative of an area in vicinity of loading dock 120. This frame of image data is displayed as display screen 410 on driver display device 210, as shown in FIG. 4A and referred to herein as the image captured at time T1. The image in FIG. 4A shows dock base line DB1 and dock edge line DE1 which is overlaid in, for example, a green color and is brighter than dock base line DB1. The green color of the dock edge line DE1 assists the vehicle driver by quickly indicating to the vehicle driver that trailer 110 is still relatively far away from dock edge line DE1. Highlighted text such as "Here is the dock edge" with an appropriate arrow pointer may also be presented on driver display device 210 to further assist the vehicle driver. Then in step 304, controller 202 processes the captured image to identify the higher contrast horizontal dock edge line DE1 associated with loading dock 120.

In step 306, controller 202 determines angle θ1 (FIG. 5A) between sight line L2 and horizontal extension line HL. A value for Δh is retrieved from memory, as shown in step 308. Controller 202 in step 310 then calculates running distance R1 (FIG. 5A) based upon the retrieved Δh value and the angle θ1 value determined in step 306. As shown in step 312, the calculated value of R1 from step 310 is displayed on driver display device 210 so that the driver can see how much farther trailer 110 needs to be backed up to reach dock edge DE1.

A determination is then made in step 314 as to whether the calculated running distance value R1 from step 310 is less than a predetermined distance value. If determination in step 314 is negative (i.e., trailer 110 has not yet backed up to within a predetermined distance from dock edge DE1 appearing on driver display device 210 shown in FIG. 4A), the process proceeds back to step 302 to capture the next frame of image data which is representative of the area in vicinity of loading dock 120. The above-described process is repeated to calculate an updated running distance value R2 (FIG. 5B), as trailer 110 has now moved a distance D1 from a previous position such as shown in FIG. 5A to the current position such as shown in FIG. 5B. Distance D1 may comprise an approximate distance and not an exact distance the trailer 110 has moved.

In FIG. 5B, the running distance is designated as R2, and the angle between sight line L2 and the horizontal extension line HL is designated θ2. The frame of image data corresponding to the position of trailer 110 shown in FIG. 5B is displayed as display screen 420 on driver display device 210, as shown in FIG. 4B and referred to herein as the image captured at time T2. The image in FIG. 4B shows dock base line DB2 and dock edge line DE2 which is overlaid in, for example, a yellow color and is brighter than dock base line DB2. The yellow color of the dock edge line DE2 assists the vehicle driver by quickly alerting and indicating to the vehicle driver that trailer 110 is approaching closer to dock edge line DE2. The updated running distance R2 shown in FIG. 5B is less than the previous running distance R1 shown in FIG. 5A.

The above-described process repeats itself to provide updated running distances until the last updated running distance is within a predetermined distance value such as shown in the display screen 430 of FIG. 4C. It should be apparent that trailer 110 has now moved a distance D2 from a previous position such as shown in FIG. 5B to the current position such as shown in FIG. 5C. In FIG. 4C, the running distance is designated as R3, and the angle between sight line L2 and horizontal extension line HL is designated θ3. The frame of image data corresponding to the position of trailer 110 shown in FIG. 5C is displayed as display screen 430 on driver display device 210, as shown in FIG. 4C and referred to herein as the image captured at time T3. The image in FIG. 4C shows dock edge line DE3 which is overlaid in, for example, a red color, and does not show a dock base line because it is no longer in the field of view of camera 130 or dock edge 122 is protruding farther than dock base 124. The red color of the dock edge line DE3 assists the vehicle by quickly warning and indicating to the vehicle driver that trailer 110 is at or nearly at dock edge line DE3. The updated running distance R3 shown in FIG. 5C is less than the running distance R2 shown in FIG. 5B. In one embodiment, dock edge DE3 may be pulsated at a color over a shorter frequency to indicate that the running distance is getting smaller.

When the last updated running distance is within the predetermined distance value, the determination in step 314 in FIG. 3 becomes affirmative. When this occurs, the process proceeds to step 318. In step 318, a message is presented on driver display device 210 to indicate to the driver that trailer 110 is within the predetermined distance from dock edge 122 of loading dock 120. The message presented on driver display driver 210 may comprise any combination of numbers and symbolic displays of remaining range. Symbolic displays may include a shortening bar or a completing pie chart, for examples. Also, the use of any combination of colors on the symbolic displays facilitates ease of their interpretation.

Alternatively, or in addition to presenting a message on driver display device 210, driver alert device 212 may be activated to indicate to the vehicle driver that trailer 110 is within the predetermined distance from dock edge 122 of loading dock 120. Also, vehicle brakes may be automatically activated (i.e., without vehicle driver intervention) when the last updated running distance is determined to be within the predetermined distance value from dock edge 122 of loading dock 120. The process of FIG. 3 then terminates.

Figure 6A:
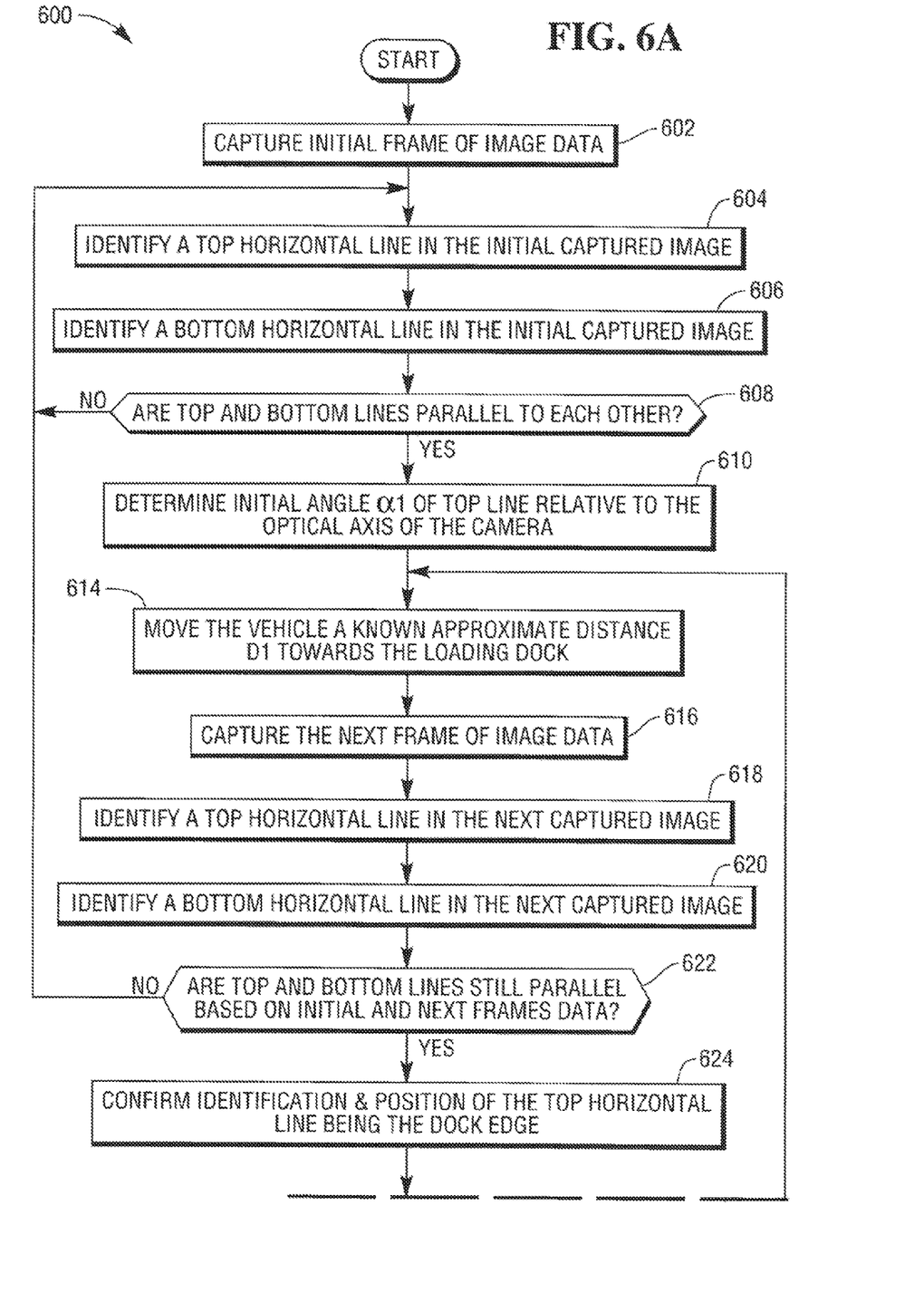
FIGS. 6A and 6B show a flow diagram depicting a method of operation of the vehicle driver assistance apparatus of FIG. 2 in accordance with another embodiment.
Figure 6B:
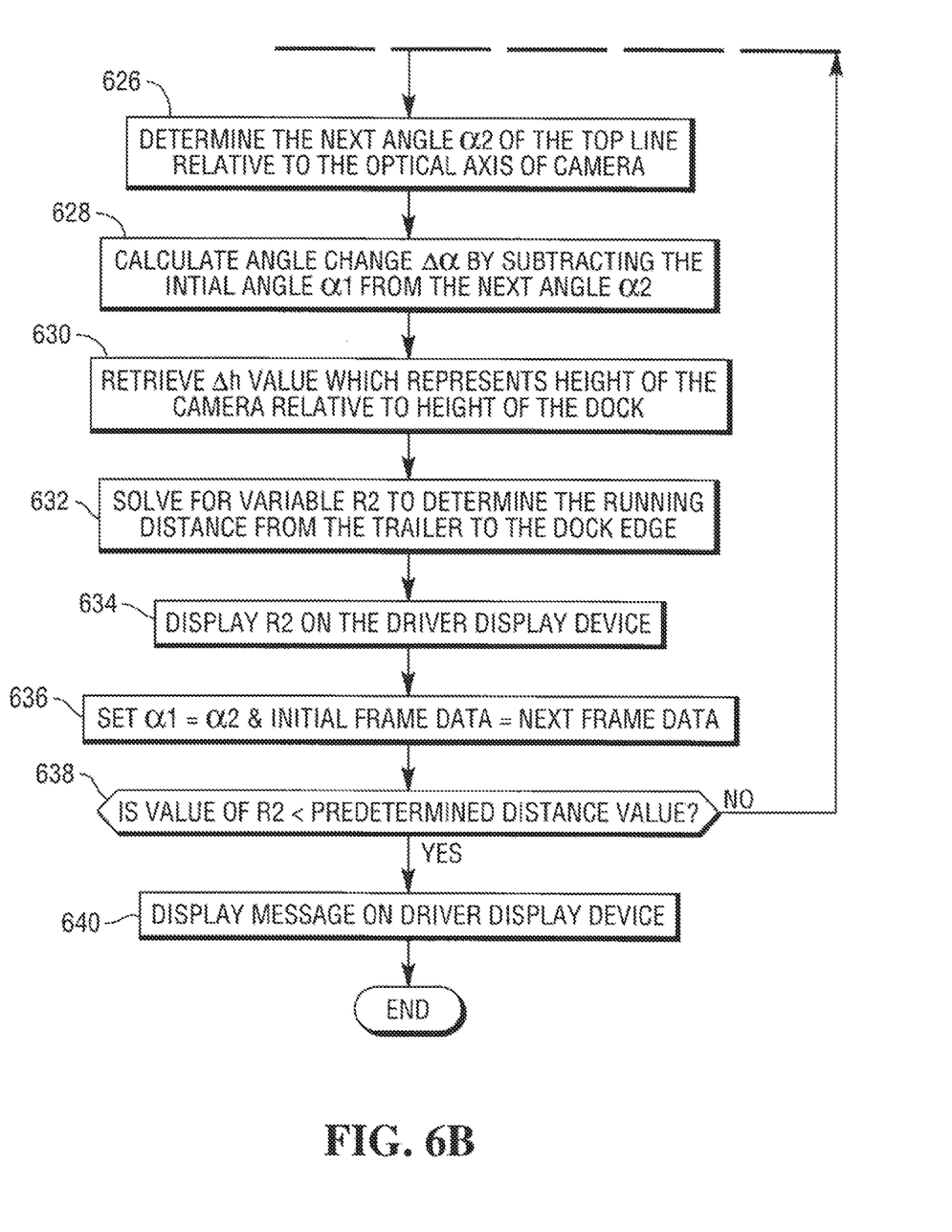

Another embodiment is illustrated in flow diagram 600 of FIGS. 6A and 6B. Reference to the display screens shown in FIGS. 4A and 4B and the trigonometric relationships shown in FIGS. 5A and 5B will be made to explain equations which are applicable to the embodiment of FIGS. 6A and 6B. From the trigonometric relationships shown in FIGS. 5A and 5B, the following sequence of equations can be written:

$$\tan\alpha 1 = \frac{\Delta h}{R1} \quad (1)$$

$$\tan\alpha 2 = \frac{\Delta h}{R2} \quad (2)$$

$$R1 = R2 + D1 \quad (3)$$

$$\tan\alpha 1 = \frac{\Delta h}{R2 + D1} \quad (4)$$

$$\alpha 1 = \tan^{-1}\frac{\Delta h}{R2 + D1} \quad (5)$$

$$\alpha 2 = \tan^{-1}\frac{\Delta h}{R2} \quad (6)$$

$$\alpha 2 - \alpha 1 = \tan^{-1}\frac{\Delta h}{R2} - \tan^{-1}\frac{\Delta h}{R2 + D1} \quad (7)$$

$$\Delta\alpha = \tan^{-1}\frac{\Delta h}{R2} - \tan^{-1}\frac{\Delta h}{R2 + D1} \quad (8)$$

It should be apparent that the last equation (i.e., Equation (8)) suggests that only the angular difference (i.e., $\Delta\alpha$) needs to be known to solve for the unknown running distance of R2 since the quantities of $\Delta h$ and D1 are known values. Accordingly, if a value for $\Delta\alpha$ can be determined, the value of R2 in Equation (8) above can be solved by using the computing capability of controller 202. Moreover, the angles $\alpha 1$ and $\alpha 2$ need not be determined relative to only horizontal extension line HL, but can be determined relative to any arbitrary reference line. For purposes of describing the embodiment of FIGS. 6A and 6B below, this arbitrary reference line is chosen to be the optical axis (which lies on line L1) of camera 130.

In step 602 of FIGS. 6A and 6B, camera 130 captures an initial frame of image data which is representative of an area in vicinity of loading dock 120 (FIG. 1). This initial frame of image data is displayed display screen 410 on driver display device 210, as shown in FIG. 4A and referred to herein as the image captured at time T1. The image in FIG. 4A shows dock base line DB1 and higher contrast dock edge line DE1 above dock base line DB1. In step 604, controller 202 processes the captured image to identify the higher contrast top horizontal line DE1. Also, in step 606, controller 202 processes the captured image to identify lower contrast bottom horizontal line DB1.

A determination is made in step 608 as to whether the top and bottom lines from steps 604 and 606 are parallel to each other. If determination in step 608 is negative (i.e., the top and bottom lines are not parallel to each other), the process returns back to steps 604 and 606 to identify top and bottom horizontal lines again. However, if determination in step 608 is affirmative (i.e., the top and bottom lines are parallel to each other), the process proceeds to step 610. In step 610, a determination is made of the angle $\alpha 1$ of the higher contrast top line L2 relative to the optical axis L1 of the camera 130, as shown in FIG. 5A. In step 614, the vehicle moves a known approximate distance of D1 towards dock edge 122 of loading dock 120.

Then, in step 616, camera 130 captures the next frame of image data. In step 618, controller 202 processes the captured next image to identify the higher contrast top horizontal line DE2 as shown in FIG. 4B. Also, in step 606, controller 202 processes the captured next image to identify the lower contrast bottom horizontal line DB2. A determination is then made in step 622 as to whether the top and bottom lines from steps 618 and 620 are parallel to each other. If determination in step 622 is negative (i.e., the top and bottom lines are not parallel to each other), the process returns back to steps 604 and 606 to identify top and bottom horizontal lines again. However, if determination in step 622 is affirmative (i.e., the top and bottom lines are parallel to each other), the process proceeds to step 624. The affirmation of this last step (i.e., step 622) helps to confirm that the higher contrast top horizontal line shown in FIG. 4B is likely to be the dock edge of the loading dock, as shown in step 624.

In step 626, a determination is made of the next angle $\alpha 2$ of the higher contrast top horizontal line L2 relative to the optical axis L1 of the camera 130, as shown in FIG. 5B. In step 628, the angle $\alpha 1$ (FIG. 5A) is subtracted from the angle $\alpha 2$ (FIG. 5B) to provide and angular difference (i.e., $\Delta\alpha$). It should be noted that this angular difference corresponds to $\Delta\theta$ expressed in Equation (8) above. In step 630, height value $\Delta h$ which represents height of camera 130 relative to height of dock edge 122 is retrieved from memory.

The retrieved value of $\Delta h$ from step 630, the known approximate distance value of D1 from step 614, and the calculated angular difference value of $\Delta\alpha$ from step 628 are plugged into Equation (8) above. As shown in step 632, Equation (8) is then solved for the unknown variable of R2 which represents the current running distance from trailer 110 to dock edge 122 of loading dock 120. After the value of R2 is determined in step 632, the R2 value is displayed as display screen 420 (FIG. 4B) on driver display device 210, as shown in step 634, to indicate to the vehicle driver the current running distance from the trailer 110 to the dock edge 122 of loading dock 120.

In step 636, the value of the angle α1 is set equal to the value of the angle α2, the initial frame data is set equal to the next frame data. Then, in step 638, a determination is made as to whether the just calculated value of R2 is less than a predetermined distance value. If determination in step 638 is negative (i.e., the current running distance from the trailer 110 to the dock edge 122 has not yet reached below the predetermined distance), the process proceeds back to 614 to capture the next frame of data and to move the trailer 110 back another approximate distance towards dock edge 122. The above-described process in FIGS. 6A and 6B repeats itself to provide updated running distances until the last updated running distance is within the predetermined distance value.

When the last updated running distance is within the predetermined distance value, the determination in step 638 in FIGS. 6A and 6B becomes affirmative. When this occurs, the process proceeds to step 640. In step 640, a message is presented on driver display device 210 to indicate to the vehicle driver that trailer 110 is within the predetermined distance from dock edge 122 of loading dock 120. The message presented on driver display device 210 may comprise any combination of numbers and symbolic displays of remaining range. Symbolic displays may include a shortening bar or a completing pie, for examples. Also, the use of any combination of colors on the symbolic displays facilitates ease of their interpretation.

Alternatively, or in addition to presenting a message on driver display device 210, driver alert device 212 may be activated to indicate to the vehicle driver that trailer 110 is within the predetermined distance from dock edge 122 of loading dock 120. Also, vehicle brakes may be automatically activated (i.e., without vehicle driver intervention) when the last updated running distance is determined to be within the predetermined distance value from dock edge 122 of loading dock 120.

It should be apparent from the embodiment of FIGS. 6A and 6B that a two-stage process is used to confirm identity and location of a dock edge. This two-stage process involves examining not just the higher contrast horizontal line which may be the dock edge, but also examining another horizontal line which is below and parallel to the higher contrast line to confirm identification of the higher contrast line as being the dock edge.

It should be apparent that running distance of the vehicle from dock edge 122 of loading dock 120 is determined by performing frame-by-frame mathematical analysis and calculations of angles associated with a higher contrast horizontal line which is contained in successive image frames and is representative of dock edge 122 of loading dock 120 and. Each angle value may be based on approximate height of dock edge 122 and approximate distance the vehicle has moved between successive image frames. Accordingly, each corresponding running distance value is based on approximate height of dock edge 122 and approximate distance the vehicle has moved between successive image frames.

It should also be apparent that the vehicle driver is provided with an alert or a warning that the vehicle is closely approaching or has moved to within a predetermined distance from an object (such as a fixed object like dock edge 122 of loading dock 120). The alert or warning is provided without the use of any external device on loading dock 120. Accordingly, a relatively simple and reliable way of indicating the running distance between the vehicle and the dock edge 122 of loading dock 120 is provided to assist the vehicle driver in maneuvering the vehicle relative to the loading dock 120.

It should be understood that the three display screens 410, 420, 430 and the time spacing between times T1 and T2 and between times T2 and T3 shown in FIGS. 4A, 4B, and 4C are shown exaggerated for purposes of description. In actuality, many image frames are captured per second, many angles are determined, many running distance values are calculated, and many display screens are presented. Filtering may be performed on a running distance value, many times per second, to reduce measurement noise. A Kalman filter is an example filtering scheme which can be used.

It should also be understood that an assumption has been made that a higher contrast horizontal line can be identified to represent the dock edge. However, it is conceivable that such a higher contrast horizontal line may not be identifiable. If this should be the case, the controller 202 may provide a signal or message to driver display device 210 to indicate to the vehicle driver that an identifiable horizontal line is unable to be found in the frames of image data being analyzed. Accordingly, the vehicle driver is alerted of the absence of a dock edge line on the driver display device 210.

Although the above description describes either one or two horizontal lines in successive image frames being identified and compared with each other, it is conceivable that any number of horizontal lines in successive frames be identified and compared. Further, although the above description describes identified dock edge lines as being green, yellow, or red, it is conceivable any combination of colors including other than green, yellow, and red are possible.

Also, although the above description describes use of one electronic controller, it is conceivable that any number of electronic controllers may be used. As an example, camera 130 may have its own dedicated electronic controller. Moreover, it is conceivable that any type of electronic controller may be used. Suitable electronic controllers for use in vehicles are known and, therefore, have not been described.

Also, although the above description describes apparatus 200 as comprising both driver display device 210 and display alert device 220, it is conceivable that apparatus 200 may include only driver display device 210 and not a driver alert device. It is also conceivable that apparatus 200 may include only driver alert device 220 and not a driver display device.

Further, although the above description describes camera 130 as being a video camera which captures real-time image data, it is conceivable that a picture camera which captures still-frames be used. As an example, camera 130 may comprise a color camera which provides single screen shots of color pictures. It should be apparent that a single video frame from a video camera may be thought of as a single screen shot.

Although the above description describes a camera being mounted on back of the vehicle, it is conceivable that the camera may be mounted at a location which is other than on back of the vehicle. As examples, the camera may be mounted on one side of the vehicle or at front of the vehicle. It is also conceivable that the camera captures image data which is representative of objects in vicinity of other than back of the vehicle. As an example, the camera may capture image data which is representative of objects in front of the vehicle. In this example, rules contained in algorithms for determining running distance in the forward direction may need to be modified accordingly based on the fact that objects are now in front of the vehicle and not in back of the vehicle.

Also, although the above description describes apparatus 200 being used in a heavy vehicle such as a truck, it is conceivable that apparatus 200 may be used in a non-heavy vehicle such as a passenger car. It is also conceivable that apparatus 200 may be used in other types of "vehicles" such as busses, recreational vehicles, railway cars, bulldozers, fork lifts, and the like where movement of the vehicle toward an object is possible.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A vehicle driver assistance apparatus for a vehicle, the vehicle driver assistance apparatus comprising: an image capture device arranged to capture image data which is representative of an object in vicinity of the vehicle; and an electronic controller arranged to (i) process the captured image data to identify an edge line associated with the object, (ii) process the captured image data further based upon the identified edge line to identify a distance between the vehicle and the edge line of the object, (iii) determine a first angle which is defined between an optical axis line extending from the image capture device and a first sight line extending from the image capture device to the identified edge line, (iv) determine a second angle which is defined between the optical axis line of the image capture device and a second sight line extending from the image capture device to the identified edge line after the vehicle has moved a distance towards the identified edge line of the object, (v) determine an angular difference between the first and second angles, and (vi) determine a remaining distance the vehicle is away from the identified edge line of the object based upon the calculated angular difference and the distance the vehicle has moved towards the identified edge line of the object.

2. A vehicle driver assistance apparatus according to claim 1, further comprising a driver display device, wherein the electronic controller is further arranged to present on the driver display device a representation of the distance between the vehicle and the edge line of the object.

3. A vehicle driver assistance apparatus according to claim 1, wherein the image capture device includes a dedicated controller which communicates with the electronic controller.

4. A vehicle driver assistance apparatus according to claim 1, wherein the electronic controller is further arranged to provide a signal to indicate absence of an edge line of the object when the electronic controller is unable to process image data from the image capture device to identify an edge line of the object.

5. A vehicle driver assistance apparatus according to claim 1, further comprising a visible light source arranged to illuminate the vicinity of the object to increase contrast of edge lines of the object for when the image capture device captures image data which is representative of the object.

6. A vehicle driver assistance apparatus according to claim 1, wherein the electronic controller is further arranged to activate vehicle brakes when the identified distance between the vehicle and the edge line of the object is less than a predetermined distance value.

7. A vehicle driver assistance apparatus according to claim 1, wherein the identified edge line associated with the object comprises a straight horizontal line which is representative of a horizontal dock edge line associated with a truck loading dock.

8. A vehicle driver assistance apparatus according to claim 1, further comprising a driver audio alert device which activates when the distance between the vehicle and the identified edge line of the object is less than a predetermined distance value.

9. A vehicle driver assistance apparatus according to claim 1, wherein the image capture device is arranged to capture image data which is representative of a fixed object in back of the vehicle.

10. A method of processing images having a first edge line of an object in vicinity of a vehicle to determine a distance between the vehicle and the object, the method comprising the steps of: receiving a first image containing the first edge line of the object in vicinity of the vehicle at a first time; determining a first angle which is defined between an optical axis line extending from an image capture device and a first sight line extending from the image capture device to the first edge line; receiving a second image containing the first edge line in vicinity of the vehicle at a second time which is after the first time; determining a second angle which is defined between the optical axis line of the image capture device and a second sight line extending from the image capture device to the first edge line in the second image; determining an angular difference between the first and second angles; and determining the distance between the vehicle and the object based upon a comparison of the relative positions of the first edge line in the first image and the first edge line in the second image and the angular difference.

11. A method according to claim 10, further comprising the step of: providing a signal to alert driver of the vehicle when a determination is made that the distance between the vehicle and the object is less than a predetermined distance value.

12. A method according to claim 10, wherein (i) each of the first and second images contains a second edge line of the object, and (ii) the determining of the vehicle distance between the vehicle and the object is also based upon the relative positions of the second edge line in the first image and the second edge line in the second image.

13. A method according to claim 12, wherein the providing a signal to alert driver of the vehicle device occurs when a determination is made that the distance between the vehicle and the object is less than the predetermined distance value based upon the comparison of the relative positions of the first edge lines in the first and second images and the comparison of the relative positions of the second edge lines in the first and second images.

14. A method according to claim 10, wherein (i) receiving a first image containing the first edge line of the object in vicinity of the vehicle at a first time includes receiving the first image containing the first edge line of the object in back of the vehicle at the first time, and (ii) receiving a second image containing the first edge line of the object in vicinity of the vehicle at a second time includes receiving the second image containing the first edge line in back of the vehicle at the second time.

15. A method according to claim 10, wherein the method is performed by a computer having a memory executing one or more programs of instructions which are tangibly embodied in a program storage medium readable by the computer.

* * * * *